United States Patent
Sargent et al.

[11] 3,882,799
[45] May 13, 1975

[54] WASTE DISPOSAL SYSTEM AND METHOD

[75] Inventors: Charles L. Sargent, Ypsilanti; John A. Hoffman, Brighton, both of Mich.

[73] Assignee: Thermasan Corporation, Ann Arbor, Mich.

[22] Filed: May 31, 1973

[21] Appl. No.: 365,511

Related U.S. Application Data

[62] Division of Ser. No. 206,711, Dec. 10, 1971, abandoned.

[52] U.S. Cl............... 110/9 R; 4/114; 4/131; 60/317; 210/152
[51] Int. Cl............................................. A47k 11/02
[58] Field of Search ............. 60/317, 310; 110/8, 9, 110/8 R, 9 R; 210/152, 184, 175; 4/131, 114

[56] References Cited
UNITED STATES PATENTS

| | | | |
|---|---|---|---|
| 200,731 | 2/1878 | Kimball | 4/131 |
| 2,565,720 | 8/1951 | Collison | 4/131 |
| 3,098,144 | 7/1963 | Dale | 110/9 |
| 3,102,800 | 9/1963 | Bora | 60/310 |
| 3,731,490 | 5/1973 | Sargent | 210/152 |

FOREIGN PATENTS OR APPLICATIONS

| 258,671 | 5/1949 | Switzerland | 60/317 |
|---|---|---|---|

Primary Examiner—Kenneth W. Sprague
Attorney, Agent, or Firm—Olsen and Stephenson

[57] ABSTRACT

Apparatus for and method of disposing of liquid and organic waste material through the exhaust system of an engine wherein the waste material is collected in a holding tank from which it is metered by a pump into the exhaust gases from the engine only under controlled conditions. A plurality of pump control means are disclosed for operating the pump only in accordance with the prescribed conditions, and waste injection apparatus is disclosed for injecting the waste material directly into the exhaust pipe of the engine.

6 Claims, 12 Drawing Figures

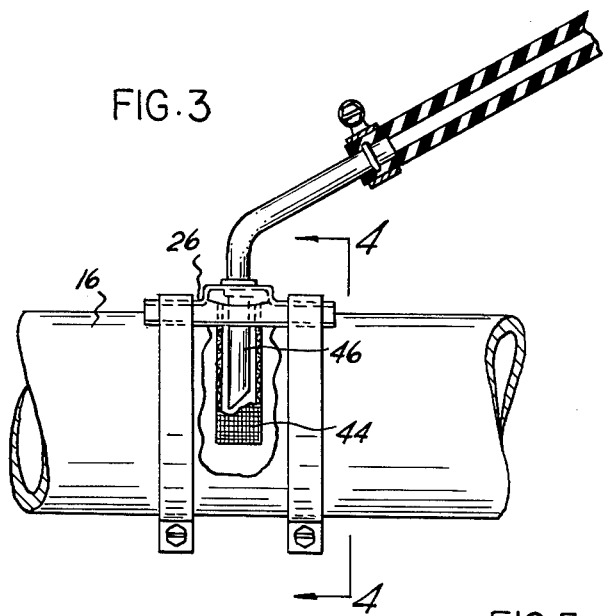
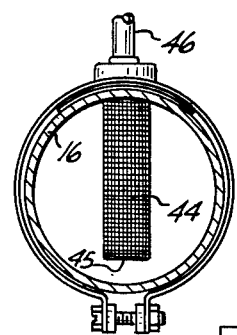
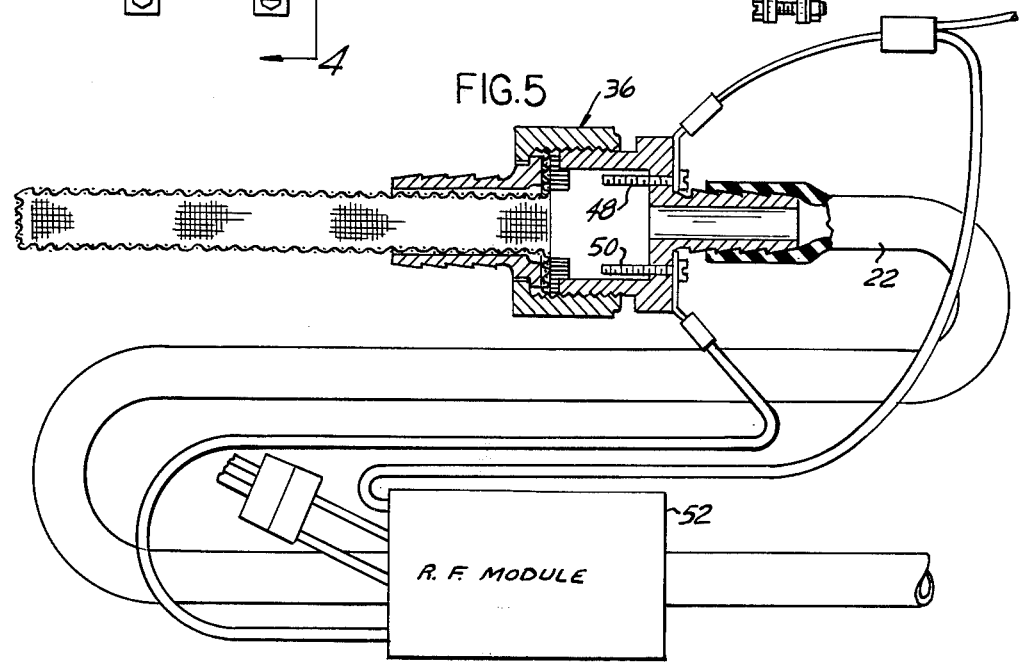
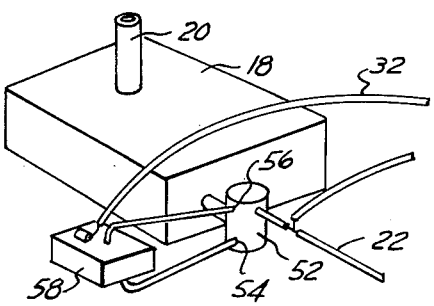

WASTE DISPOSAL SYSTEM AND METHOD

REFERENCE TO RELATED APPLICATION

This application is a divisional application of pending application of Charles L. Sargent et al., Ser. No. 206,711, filed Dec. 10, 1971, now abandoned, entitled "Waste Disposal System and Method."

BACKGROUND OF THE INVENTION

The present invention relates generally to improvements in waste disposal systems and more particularly to a disposal system especially designed for the disposal of human waste and other liquid waste products.

Although no limited thereto, the waste disposal system of the present invention has particular utility in recreational vehicles, busses, trucks, motor homes, house trailers, boats and various other types of vehicles utilized for human transportation. The disposal system may also be used in domestic housing installations or the like where a conventional sewage system is not available.

The invention is particularly applicable to recreational vehicles having internal combustion engines although it is to be understood that the invention has broader applications and may be used with fuel burning engines that serve to provide propulsion, as well as with fuel burning engines that are part of a stationary installation. In all of such applications whether the engine is gasoline, diesel or a turbine the liquid and organic waste materials are disposed through the exhaust system of the engine.

Efforts have been made recently to utilize the waste heat in the exhaust system of a vehicle to dispose of waste materials. One such system is disclosed in U.S. Pat. No. RE26,819, reissued May 26, 1970 to James S. Reid, wherein the waste is injected into a drum which surrounds the exhaust pipe and the hot exhaust gases are utilized to vaporize the waste material which is then discharged to the atmosphere. A more recent development is disclosed in the aforesaid copending application, Ser. No. 156,403 of Charles L. Sargent, which discloses apparatus wherein the waste material is discharged directly into the hot exhaust gases. In the latter system controls are provided so that the waste material will be discharged into the exhaust gases only when the vehicle is traveling at a predetermined velocity and when the temperature at the location wherein the waste material discharge into the exhaust system is above a predetermined value. To utilize the invention set forth in the aforesaid application, it is essential that the exhaust system be part of a vehicle, and the waste disposal system can then function only when the vehicle has a road speed of a preestablished magnitude. There is a need for other waste disposal systems that can have general utility not only with moving vehicles but also with stationary installations. There is also a need to provide more complete systems whereby the waste disposal operation will occur under conditions of optimum efficiency and only at proper and advantageous periods of time so that the waste, that is disposed will not pollute the atmosphere, will be free of harmful bacteria and will have minimal odor.

SUMMARY OF THE INVENTION

In the present invention an improved waste disposal system is provided wherein the waste materials from a holding tank are injected by a metering pump directly into the hot waste exhaust gases from a fuel burning engine, and improved control means determine when the metering pump is to be operated. In a preferred form of the invention three sensing means are in the pump control system, and each sensing means requires a condition to be met before the pump can operate. Thus, according to one form of the invention an improved waste disposal system is provided for use with a rotary power source which discharges waste heated gases through an exhaust system, and the waste disposal system includes a waste holding tank for receiving waste material, conduit means in communication with the holding tank and exhaust system, and a metering pump in said conduit means for pumping fluid waste material from the holding tank into the waste heated gases of the exhaust system. The pump control means is responsive (1) to the rate of revolution of the rotary power source, (2) to the load conditions that are applied to the rotary power source, and (3) to the level of the waste material in the holding tank. By virtue of these three sensing means, the pump will not operate except when the engine is running at a preselected rate of revolution, only when a load condition exists on the engine that will assure a corresponding proper temperature of the exhaust gases, and only when the level of the waste materials in the holding tank is within a preselected range.

Various modifications are disclosed for each of the three types of sensing means in the control system, whereby a variety of arrangements can be utilized for sensing the three conditions enumerated above. Also, modifications are disclosed wherein all three of the sensing conditions need not necessarily be employed simultaneously, and in some instances the disclosed modifications utilize road speed in place of the rotary speed of the engine as a control condition.

Also, an improved arrangement is disclosed for metering the waste material directly into the exhaust pipe of the exhaust system.

Accordingly, it is among the objects of the present invention to provide improvements in waste disposal systems wherein the waste materials are discharged into the hot exhaust gases of fuel burning engines.

Other objects of this invention will appear in the following description and appended claims, reference being had to the accompanying drawings forming a part of this specification wherein like reference characters designate corresponding parts in the several views.

BRIEF DESCRIPTION OF THE DRAWING.

FIG. 3 is an enlarged fragmentary view of improved apparatus for injecting waste material directly into the exhaust gases flowing in the exhaust pipe of the vehicle;

FIG. 4 is a section taken on the line 4—4 of FIG. 3;

FIG. 5 is an enlarge fragmentary view, partly in section, illustrating the level sensing means for the control system of the embodiment shown in FIG. 1;

FIG. 6 is a perspective view showing a modified form of the level sensing means that can be used with the embodiment of the invention shown in FIG. 1;

DESCRIPTION OF THE PREFERRED EMBODIMENTS.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
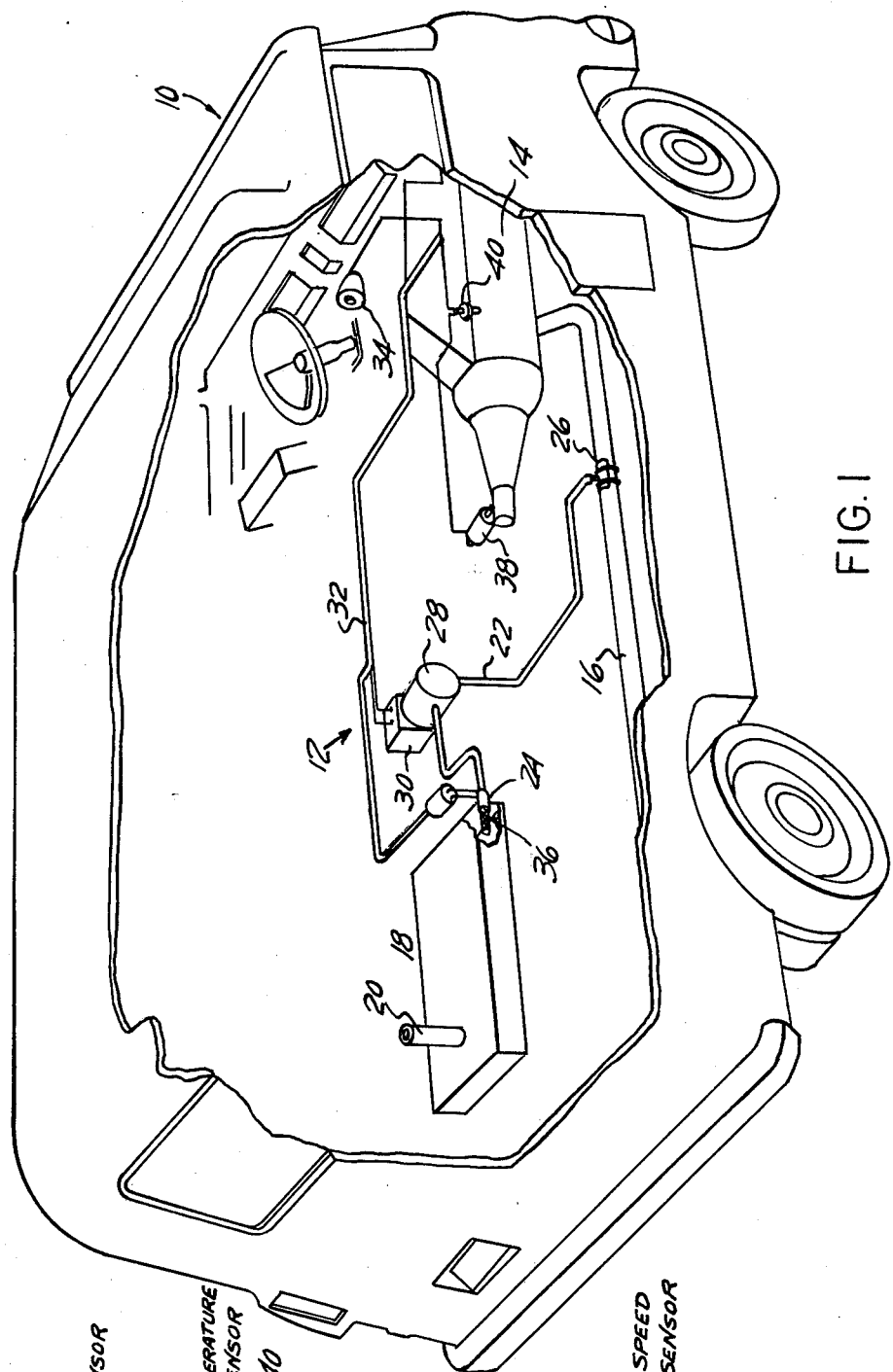
FIG. 1 is a fragmentary perspective view of a motor vehicle containing a preferred embodiment of the present invention.
Figure 2:
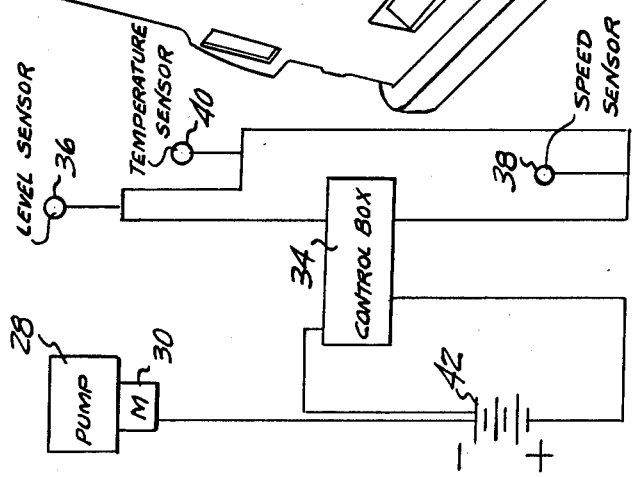
FIG. 2 is a schematic diagram of the control system for the waste disposal system illustrated in FIG. 1.

Referring now to the drawings, the invention will be described in greater detail. Referring first to FIGS. 1 and 2, a motor vehicle 10 is shown including the waste disposal system 12. The motor vehicle 10 has a conventional internal combustion engine 14 with an exhaust pipe 16 which is part of the exhaust system of vehicle 10.

The waste disposal system 12 includes a holding tank 18 adapted to receive liquid and organic waste materials through the inlet conduit 20. Conduit means 22 is in communication with the holding tank 18 at the outlet 24 and in communication with the exhaust pipe 16 at the waste injection apparatus 26. A metering pump 28 is in the conduit means 22 for pumping fluid waste material from the holding tank into the waste heated gases of the exhaust system. An electric motor 30 is connected to the metering pump 28 for operating the pump 28 when certain conditions have been met with respect to the operation of the vehicle 10.

The electric motor 30 is part of an electric contol circuit 32 which includes the control box 34, a level sensing element 36 which is located adjacent to the holding tank 18, a speed sensing element 38, which in the described embodiment is a speed sensing switch responsive to the road speed of the vehicle 10, and a temperature sensing element 40, which in the illustrated embodiment is a vacuum switch in the intake manifold of the engine where the extent of vacuum will indicate the load on the engine and thereby the temperature and volume of the exhaust gases in the pipe 16.

As shown schematically in FIG. 2, the three sensing probes or elements 36, 38 and 40 are in series with the control box 34 so that until such time as all three sensing elements indicate that required conditions have been met, the control box 34 will prevent the circuit to the electric motor 30 from being energized from the source of electrical energy 42.

It will be understood from the description that follows that the invention is not limited to the specific types of sensing elements 36, 38 and 40, because different types of sensing elements can be used for each of these specific elements. With respect with the level sensing element 36, the essential requirement is that the element detect the level of the waste materials in the holding tank 18 and the sensing element 36 is to function so that the pump 28 can operate at times when the level within the tank exceeds a preestablished amount. By virtue of this arrangement, the metering pump can function to meter waste materials into the exhaust pipe 16 during such times when the holding tank contains a substantial amount of waste material, and when the tank is near its empty condition, the level sensing element 36 will open the circuit to the motor 30 automatically so that the operator of the vehicle need not be concerned about the pump being operated when the tank 18 is empty.

The speed senser 38 functions to prevent operation of the waste disposal system except when the road speed of the vehicle is above preestablished limits of miles per hour. This control condition assures that waste material will be discharged to the exhaust pipe only when certain limits for vehicle speed and engine load are met and thereby flow of exhaust gases is occurring through the exhaust pipe 16. The temperature sensing element 40 functions to prevent the system from operating except at such times when the exhaust gases in the pipe 16 are above a preestablished minimum temperature. This condition assures that the bacteria will be exposed to sufficiently high temperatures to cause their destruction and also so that the liquid waste materials will be subjected to sufficiently high gas temperatures to be superheated and to aid in the complete destruction of the organic waste as it is being discharged from the exhaust system.

As shown best in FIGS. 3 and 4, an improved and simplified waste injection apparatus 26 is provided which includes a tubular screen 44 which is opened at its free end 45. The tubular screen 44 extends generally diametrically through the pipe 16 from the upper surface thereof and terminates adjacent to but spaced away from the opposite side of the exhaust pipe 16. A waste inlet conduit 46 extends through an aperture in the wall of the conduit 16 and terminates in the screen in spaced relation thereto a remote distance from the open end 45 thereof. The waste injection apparatus includes the pump 28 which meters the flow of the waste material through the conduit 46 for discharge within the screen 48. In normal operation, the hot exhaust gases will flow through the screen 44 picking up the liquid waste as it is falling within the screen so as to break the waste into fine particles. This serves a two fold purpose. First it helps to break the liquid into a fine spray so that the hot gases can more quickly convert the liquid into the superheated steam, and second it aids in breaking up the waste material so that the hot gases can more readily have access to the bacteria in the waste material to cause complete destruction of such bacteria. The screen 44 is opened at the lower end so that if dry matter should be formed it can be discharged through the open bottom of the screen, thereby avoiding plugging of the screen. It is found that a thirty mesh screen is satisfactory for this purpose.

Attention is next directed to FIG. 5 which discloses in greater detail the level sensing element 36 that is shown in the form of the invention illustrated in FIG. 1. The level sensing element 36 includes two terminals 48 and 50 which are electrically connected to the radio frequency module 52 which is adapted to be triggered by the presence of liquid between the terminals 48 and 50. The level sensing element 36 is mounted in the wall of the holding tank 18 and is a part of the conduit means 22 so that when the level of the liquid in the holding tank 18 is above the terminal 48, the liquid across the terminals will trigger the radio frequency module 52 so that operation of the pump 28 can occur. When the level of the liquid is below the terminal 48, the control circuit will remain open so that the pump 28 need not operate continuously during such time as waste material is at a low level or not present in the tank.

In some instances it may be desired to operate the waste disposal system 12 merely in response to signals indicating vehicle speed and signals indicating that the proper exhaust gas temperature exists in exhaust pipe 16, and under these circumstances the level indicating element 36 can be used merely to turn on or off a light at the control box so that the operator of the vehicle can manually turn on or off the waste disposal system when the control panel visually indicates the level of waste material within the holding tank 18.

The invention is not limited to the use of the specific form of level indicating element shown at 36 in the drawings. If desired, the conduit means 22 can include the container 52 (FIG. 6) which has two vertically space outlets 54 and 56 to which a liquid pressure sensing switch 58 is connected. In this arrangement the pressure sensing switch 58 will detect the level of the liquid within the container 52 and will open or closed depending upon the level of the liquid waste material in the holding tank 18. The signal will be transmitted by the electrical circuit to the control box 34 which can function either to indicate visually to the operator the level within the holding tank 18, or the signal can be used in the control circuit to prevent the pump from operating except during such times when the material in the holding tank 18 is above a predetermined level.

Figure 7:
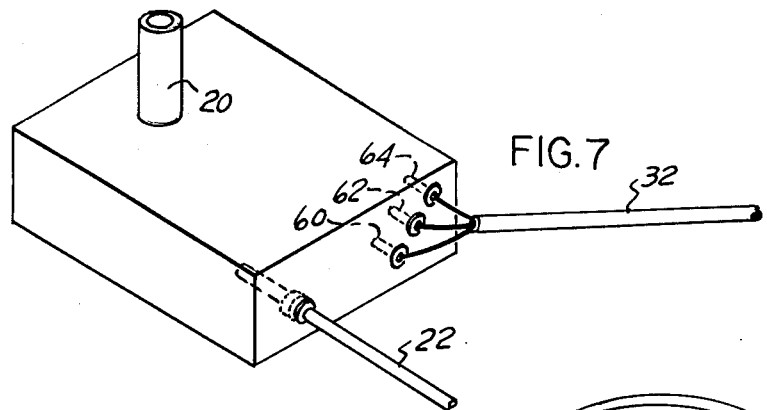
FIG. 7 is a perspective view of still another form of the level sensing means that can be used in the embodiment of the invention shown in FIG. 1.

Attention is directed to FIG. 7 which shows another suitable form of liquid indicating means that may be used to indicate the level of the liquid in the holding tank 18. As there shown, the electric control circuit includes the termistor sensors 60, 62 and 64 for sensing the level of the liquid within the holding tank and transmitting signals to the control box 34. The signals can be used either to indicate visually at the control box 34 the level of the waste material in the holding tank or they can be used in the control circuit to prevent the metering pump 28 from operating except during such times when the material in the holding tank is above a predetermined level.

Figure 8:
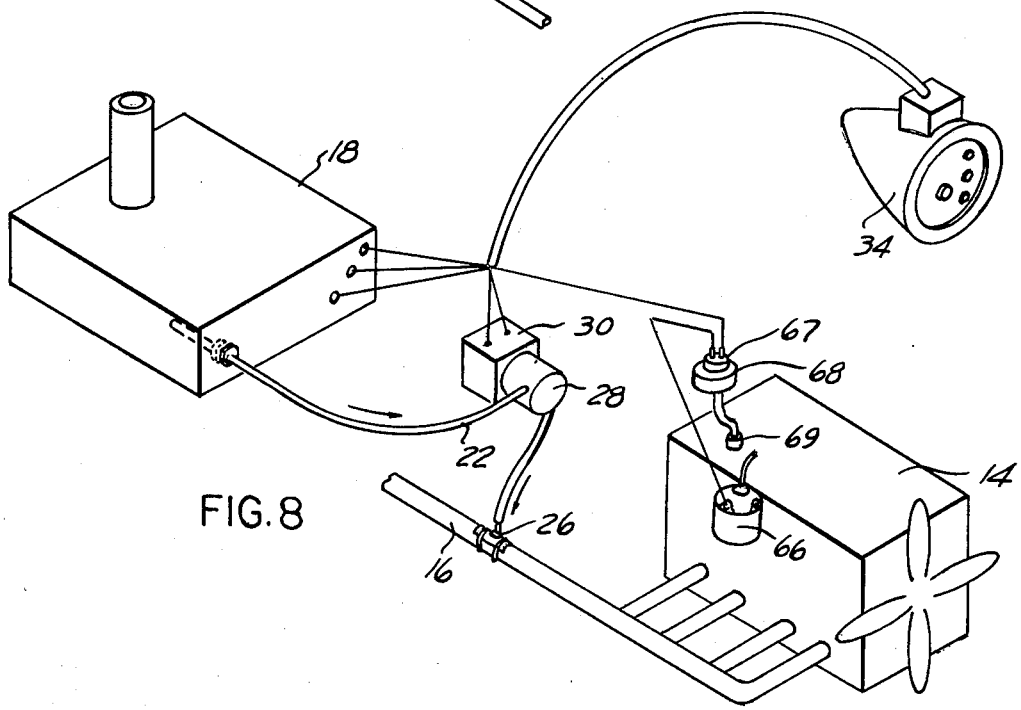
FIG. 8 is a schematic illustration of a modified form of the control system wherein modified forms of speed and load sensing means are utilized and wherein the level sensing means is the same as that illustrated in FIG. 7.

FIG. 8 illustrates still another arrangement of an improved waste disposal system wherein the pump control means is responsive to three conditions, namely, the rate of revolution of the engine 14, the load conditions on the engine 14 which reflect the temperature of the exhaust gases in the exhaust pipe 16, and the level of the liquid within the holding tank 18. In this form of the invention the rate of revolution of the engine 14, which is a spark ignition type internal combustion engine, is measured by utilizing electrical signals from the ignition coil 66 for actuating a sensing switch 67. The load conditions on the engine 14 are determined by the vacuum switch 68 which has a probe extending into the intake manifold of the engine at 69. This arrangement again is such that the motor 30 will not be energized to drive the metering pump 28 except under conditions wherein the engine 14 is turning at a prescribed rate and the load on the engine as measured by the probe associated with the pressure switch 68 is at a preestablished value to assure the temperature in the exhaust pipe 16 is sufficiently high to perform the desired functions of destroying odor, destroying bacteria and converting the waste liquid into superheated steam for discharge to the atmosphere.

Figure 9:
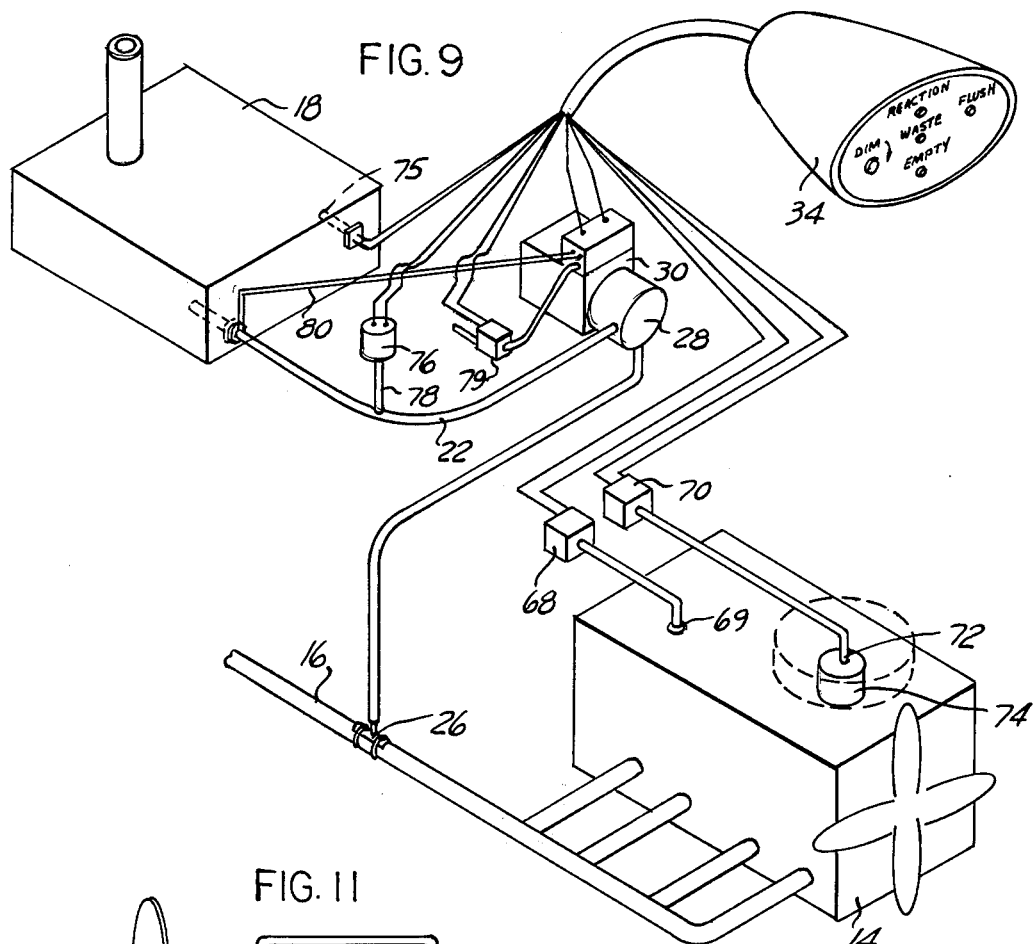
FIG. 9 is a schematic perspective view of still another arrangement for sensing the three conditions required for operation of the metering pump and also disclosing a feature for elimination of obstructions in the suction line to the metering pump of the system.

Referring now to FIG. 9, still another embodiment of the present invention will be described. In this embodiment of the invention the pump control means includes a vacuum switch 70 which is adapted to be actuated by a probe 72 extending into the airstream of the carburetor 74 of the engine 14. The vacuum switch 70 will indicate when the speed of the engine has reached a predetermined minimum speed as reflected by the velocity of air flow through the carburetor, thereby assuring that the engine speed has reached the desired minimum value. A second vacuum switch 68, essentially the same as that described with respect to the embodiment disclosed in FIG. 8, is arranged to be responsive to the probe which extends into the intake manifold of the engine 14 at 69, and as previously explained, the vacuum or pressure conditions within the intake manifold will indicate the load that is applied to the engine 14, and therefore, will reflect the temperature that exists in the exhaust pipe 16. As in the other embodiments of the invention a level sensing element is employed, in this instance being the radio frequency level control probe 75. A suitable time delay device may be employed in this circuit so that intermittant starting and stoping of an undesirable nature can be avoided. Such undesirable condition could result when the holding tank 18 is partially filled and the contents are moved by the vehicle motion.

In this embodiment, a third vacuum switch 76 is in communication with a probe 78 which extends into the conduit 22 adjacent to the inlet end of the metering pump 28 so that if the waste material within the tank 18 has plugged or is partially obstructing the conduit means 22, the probe 78 will indicate this condition. The air valve 79 can then be opened either manually or automatically to discharge air under pressure from a source not shown to the air line 80 to blow out the obstruction in the conduit means 22.

Figure 10:
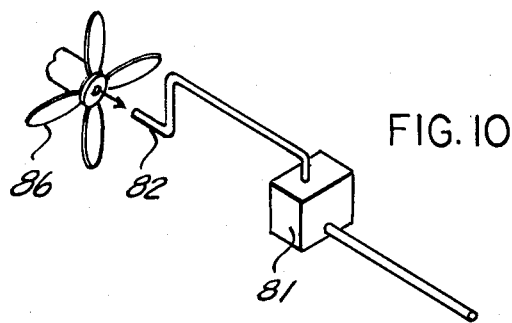
FIGS. 10, 11 and 12 illustrate modified forms of apparatus for sensing engine speed or road speed conditions that must be met before the metering pump can operate.

Still other arrangements can be used to indicate the speed of the engine 14 or the road speed of the vehicle. Thus, as shown in FIG. 10, a pressure responsive switch 81 can be used in conjunction with a pitot tube 82 which is located adjacent to the fan 84 of the engine 14. Since the fan rotates as a function of the speed of the engine 14, the flow of air from the fan will be a function of the engine speed, and the rate of flow of the air can be detected by the pitot tube 82 so as to send a signal to the pressure switch 81 which is part of the electrical control circuits that are in communication with the control box 34.

Figure 11:
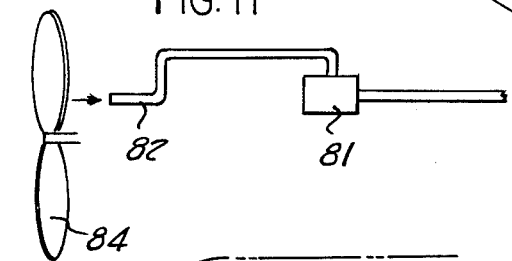
Figure 12:
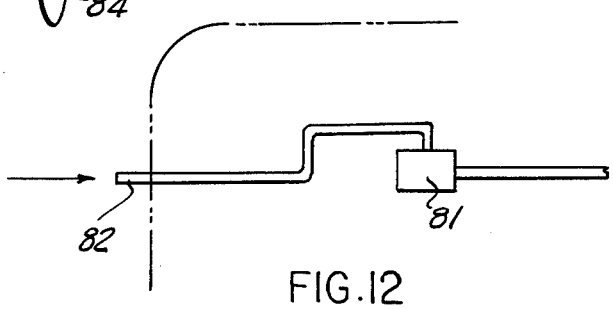

FIG. 11 shows a similar arrangement except that the fan 86 may be the fan of any auxiliary component such as the fan associated with the electric generator which is rotated at a rate that is a function of the speed of the engine 14. If desired, instead of using the pitot tube to indicate the rate of revolution of the engine, it also can be positioned so that it will reflect the rate of travel of the vehicle as shown in FIG. 12. This arrangement may be used for moving vehicles, but it will be understood that it will have no application where stationary installations are required.

From the foregoing descriptions of the various embodiments of the invention, it will be understood that the present invention provides an improved waste disposal system for use with a fuel burning power source which discharges waste heated gases through an exhaust system and wherein a pump control means is provided which may be responsive to combinations of four conditions which exist with respect to the power source and the waste holding tank. The pump control means may be responsive to the speed of the vehicle or to the rate of revolution of the power source, and also to the load conditions applied to the power source. In addition, the pump control means may also be responsive to the level of the waste material in the holding tank. The invention also incorporates an improved method and apparatus for discharging the waste material directly into the exhaust pipe of the vehicle exhaust system.

Other suitable sensing means may also be used within the scope of the invention to indicate the speed of the engine. For example, a sensing probe (not shown) may be located in the fuel line of the engine to indicate the rate of flow of the fuel to the engine and thereby the speed of the engine under constant load conditions. Also, another means of sensing the engine load is to monitor the pressure in the exhaust system. This can be accomplished by positioning a pressure switch (not shown) in or in communication with the exhaust pipe of the vehicle.

In diesel engines, as well as in gasoline engines, it is also found desirable to sense the exhaust flow as a measure of engine load. This can be accomplished by positioning a paddle (not shown) in the exhaust pipe and pivotally mounting the same so that it actuates a switch in the control circuit in response to the flow of exhaust gas. The rate of flow of the exhaust gases is a function of the load on the engine, and therefore, the switch can be arranged so that the paddle closes the switch only when a predetermined flow of gases through the exhaust pipe occurs.

In still other arrangements particularly suitable for diesel engines, but also applicable to gasoline engines, the position or angle of the throttle or a linkage associated therewith may be used in conjunction with a switch to indicate the load applied to the engine. Such arrangements can be used with any of the other control conditions for operation of the waste disposal system.

It is claimed:

1. In a waste disposal system for use with a fuel burning engine that discharges waste heated gases through an exhaust pipe, said exhaust pipe having an aperture in the wall thereof, waste injection apparatus comprising a screen in the form of a sleeve with an open end extending diametrically into said pipe through said aperture, a waste inlet conduit extending through said aperture into said screen and terminating a remote distance from the open end of the screen, and means for feeding waste material at a controlled rate through said waste inlet conduit.

2. In a waste disposal system that includes the waste injection apparatus defined in claim 1, wherein said open end of the sleeve terminates adjacent to but spaced from the wall of the pipe diametrically opposite from said aperture.

3. In a waste disposal system that includes the waste injection apparatus defined in claim 2, wherein said waste inlet conduit terminates before reaching the central axis of said exhaust pipe.

4. In a waste disposal system that includes the waste injection apparatus defined in claim 3, wherein said screen is approximately 30 mesh.

5. In a waste disposal system that includes the waste injection apparatus defined in claim 1, wherein said waste inlet conduit is supported in a saddle member mounted on the external side of said exhaust pipe, and clamp means retains said saddle on said pipe.

6. A method of disposing of liquid and organic waste material through the exhaust system of a fuel burning engine comprising the steps of feeding the waste material at a controlled rate into a generally annular screen extending transversely of the path of flow of the engine exhaust gases, and passing the exhaust gases through the screen at a rate sufficient to reduce the particle size of the waste material and at a temperature sufficient to vaporize the liquid content of the waste material.

* * * * *